G. W. CARLSON.
BRAKE MECHANISM FOR MOTOR VEHICLES.
APPLICATION FILED JULY 14, 1920.
1,394,885.
Patented Oct. 25, 1921.
2 SHEETS—SHEET 1.
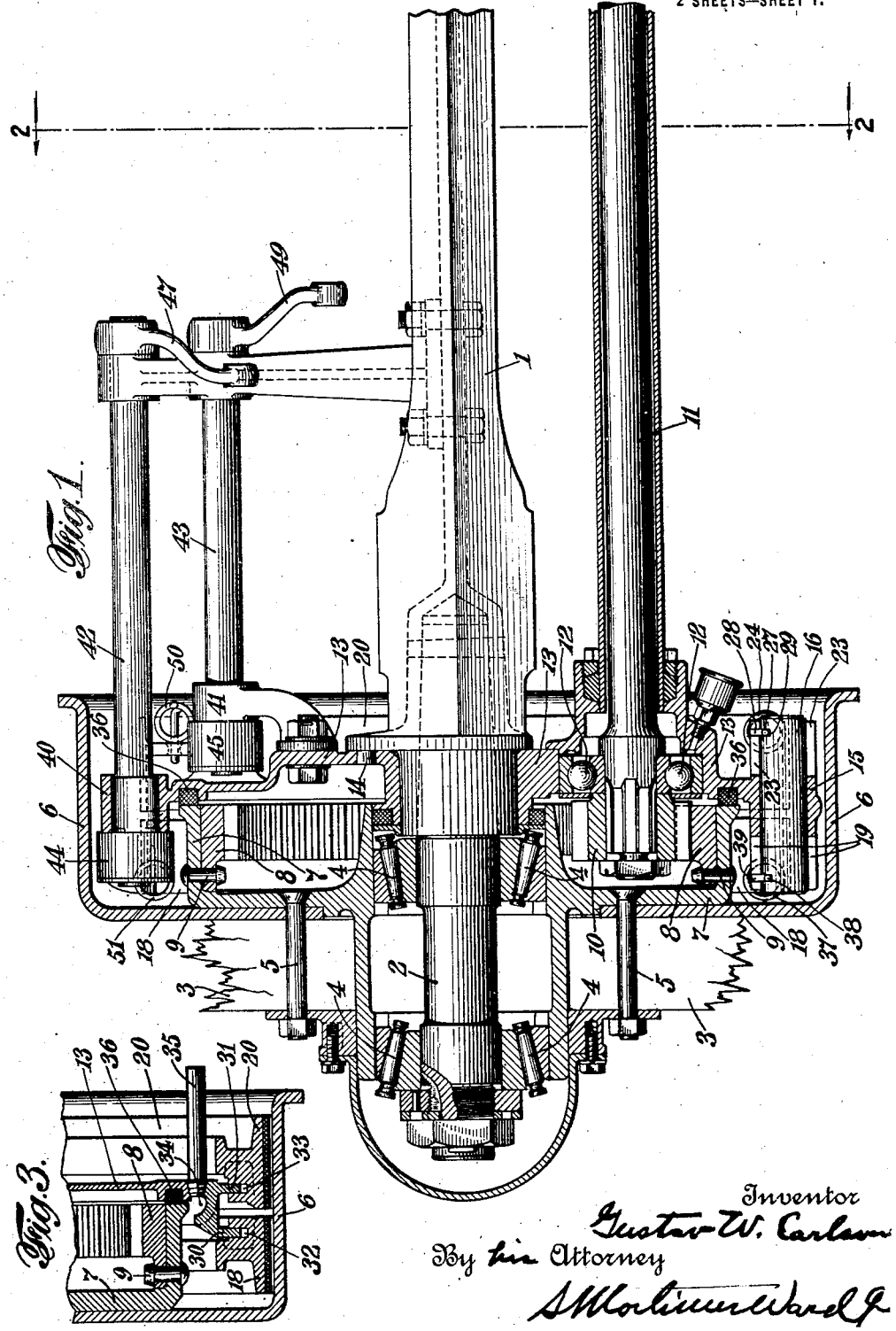
Inventor
Gustav W. Carlson
By his Attorney

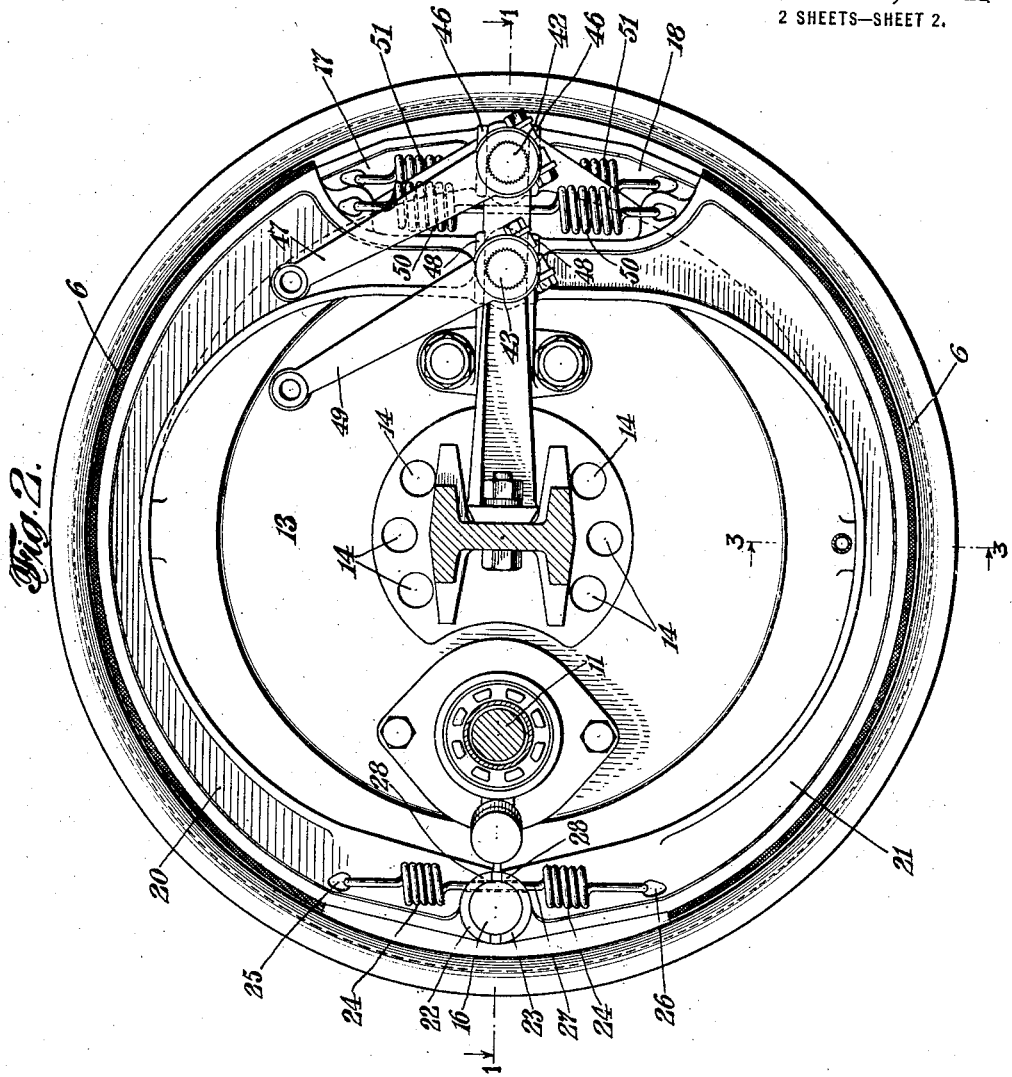
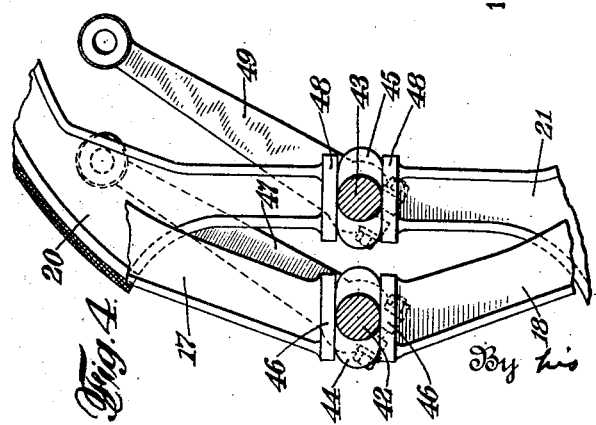

UNITED STATES PATENT OFFICE.

GUSTAV W. CARLSON, OF CLEVELAND, OHIO, ASSIGNOR TO THE TORBENSEN AXLE COMPANY, OF CLEVELAND, OHIO, A CORPORATION OF OHIO.

BRAKE MECHANISM FOR MOTOR-VEHICLES.

1,394,885.　　　　　　Specification of Letters Patent.　　Patented Oct. 25, 1921.

Application filed July 14, 1920. Serial No. 396,221.

*To all whom it may concern:*

Be it known that I, GUSTAV W. CARLSON, a subject of King Gustav V. of Sweden, (first U. S. citizenship papers taken out in September, 1918,) and a resident of Cleveland, county of Cuyahoga, and State of Ohio, have invented certain new and useful Improvements in Brake Mechanism for Motor-Vehicles, of which the following is a specification.

My invention relates to brake mechanism for motor vehicles, and the invention is especially useful in brake mechanism for heavy duty vehicles such as trucks, etc.

The main object of the invention is to provide durable and efficient brakes for trucks and the like capable of withstanding rough use and heavy duty.

In carrying out my invention in its preferred form I provide two brakes arranged side by side operating on the inner surface of the brake drum, each brake having two rigid brake band carriers pivotally supported in the same locality on one side of the axis of the drum, with the carriers of each brake operated directly by cams located between the carriers at the opposite side of the drum axis from the pivots, the cams being operated by entirely separate and independent shafts lying side by side at one side of the axle, the parts being so arranged and constructed that the brake parts may be efficiently manufactured and readily assembled and removed for inspection and repairs.

Further and more specific objects, features and advantages will more clearly appear from the detailed description given below taken in connection with the accompanying drawings which form a part of this specification.

The invention consists in the novel features, arrangement and construction of parts which are hereinafter described according to their preferred form, and the invention will be more particularly pointed out in the appended claims.

In the drawings, Figure 1 is a horizontal section through a vehicle wheel with its axle and driving apparatus and brake apparatus, taken on the line 1—1 of Fig. 2, and embodying my improvements in a preferred form thereof;

Fig. 2 is a vertical section taken on the line 2—2 of Fig. 1;

Fig. 3 is a vertical section taken on the line 3—3 of Fig. 2; and

Fig. 4 is a detail view of parts of the brakes and their operating cam shafts looking in the opposite direction from that at which they are viewed in Fig. 2.

Referring to the drawings, 1 represents a dead-axle having a spindle 2 around which rotates the wheel 3 on suitable roller bearings 4. Rigidly secured to the wheel 3 by bolts 5 is a brake drum 6, and also rigidly secured to the wheel 3 as by being integral with its hub and by the bolts 5, is an internal gear drum 7 to which is rigidly secured an internal gear 8 by bolts or rivets 9. The internal gear 8 is adapted to be driven by a gear 10 secured on a jack shaft 11 in any well known or suitable manner, the jack shaft having ball bearings 12 in a spider 13 secured to the axle 1 by pins 14. The jack shaft 11 is driven in any suitable manner to turn the internal driving gear 8 and with it wheel 3 to drive the vehicle in a manner well understood by those skilled in the art.

The stationary spider 13 is provided with a boss 15 for securing a pin 16. 17 and 18 represent two rigid brake sections of an emergency brake adapted to operate on the inside of the brake drum 6 and surrounding the internal gear 8 and having pivot bearings 19 on opposite sides of the pin 16. 20 and 21 represent two rigid brake sections of a foot brake also extending about the internal driving gear and adapted to operate on the inside of the brake drum 6 and having pivot bearings 22 and 23, respectively, on opposite sides of the other end of the pin 16, as clearly shown in Fig. 2. 24 represents a spiral tension spring having one end hooked into the section 20 at 25 and its other end hooked into the section 21 at 26 in order to hold the bearing portions 22 and 23 of the brake sections 20 and 21 together resiliently and against the pin 16. The spring 24 is provided with a central straight part 27 passing through cut-away slots 28 in the bearing portions 22 and 23 and also through a corresponding slot 29 in the pin 16 so as to form a key passing through said slots to key the brake sections in alinement on the pin 16. A similar spring 37 holds the bearing parts 19 of the brake sections 17 and 18 resiliently against the other end of the pin 16, and it is also provided with a middle straight portion 38 engaging similar grooves 39 in the bearing portions 19 and a similar cut-away groove in the pin 16, so that the spring not only holds the brake sections in operative position against the pin, but also passes through these cut-away portions in the bearing parts and in the pin to form a key to hold the sections in alinement therewith.

At points midway between the ends of the brake sections respectively, the spider 13, which is of general circular outline, is provided with integral projections 30 and 31 which have a sliding fit in slots 32 and 33 in the brake sections 18 and 20 respectively (see Fig. 3). The projections 30 and 31 and the slots 32 and 33 have only a short peripheral length and it will be understood that there are two sets of such projections in slots on the spider and brake sections, one set on one side of the axle and the other set on the opposite side of the axle, both sets being located at points substantially midway between the ends of the brake sections. These interfitting slots and projections are for the purpose of preventing lateral displacement of the brake sections, so as to keep them properly spaced and in proper alinement as they swing on their supporting pin 16. The spider 13 is provided with a peripheral oil-catching groove 34 which extends around the spider except at the portions thereof where the brakes are hinged, and where the cam shafts are journaled, and from the bottom of this groove leads a short pipe 35 through which the oil may escape, so that any oil passing from the internal gear through the packing 36 will be collected and removed without getting under the brakes.

In order to operate the brakes the spider 13 is provided with two bearings 40 and 41 in which are journaled cam shafts 42 and 43, respectively, having secured to their ends cams 44 and 45, respectively. (See also Fig. 4). Cam 44 operates against the ends 46 of brake sections 17 and 18 in order to separate the ends 46 and force the brake sections 17 and 18 against the inside of the brake drum 6 to apply the emergency brake. For this purpose the cam shaft 42 has secured to it a crank member 47 which may be operated by any suitable mechanism. The cam 45 operates on the ends 48 of brake sections 20 and 21 in order to force the same apart and engage the inside of the drum 6 to apply the foot brakes. For this purpose the shaft 43 has secured to it a crank member 49 connected with any suitable foot brake operating mechanism. A spiral tension spring 50 connects the two ends of the respective foot brake sections 20 and 21 in order to normally pull them together and release the brakes. A similar spiral tension spring 51 is connected to the ends of the brake sections 17 and 18 tending normally to pull the ends together to release the brakes.

Brakes are of importance in all motor vehicles, but in trucks and other heavy vehicles, reliability of the brake mechanism is of the utmost importance, and it is not only important that the brake apparatus be so designed as to be efficiently produced in quantity and easily assembled and removed for repair, but it is also important that the two brake mechanisms be entirely independent of each other, so that any damage or breaking of any part of one will not interfere with the use of the other, thus insuring greater certainty of operation. By having both brakes surrounding the internal gear and operating on the inside of the brake drum where they are protected, and having them operate independently by adjacent cams having entirely independent shafts journaled in independent bearings, great reliability of operation is obtainable. With the shafts closely positioned on the same side of the axle and substantially in a common plane with the axis of the wheel as shown in the drawings, the parts are out of the way and can be easily assembled and easily removed for repair and inspection. By arranging the shafts separately and adjacent to one another lying side by side on the same side of the axle, the brake-operating apparatus is made compact in form and very convenient to hook up with the rest of the brake-operating mechanism.

While I have used the word "Spider" in the specification and claims as defining the plate or supporting member 13 which carries the cam ends of the shafts 42 and 43, it will be understood that I do not wish to be limited by the use of that term to any specially shaped support, and use the term in the sense of a supporting member.

While I have described my improvements in great detail with respect to a preferred form thereof, it will be obvious to those skilled in the art, after understanding the same, that various changes and modifications may be made in the arrangement and construction of the parts without departing from the spirit and scope of my invention, and I aim in the appended claims to cover all such modifications as are within the spirit and scope of my invention.

Having thus described my invention, what I claim as new and desire to secure by Letters Patent, is:

1. In apparatus of the character described, the combination of a dead-axle, a tread wheel at the end of the axle, a driving spindle, a ring gear secured to the wheel, means gearing said spindle to said gear, a brake drum also secured to the wheel and surrounding said ring gear, two independent expansible brakes arranged side by side and operating on the inside of said brake drum, both brakes being hinged at the same side of the axis of the drum, two brake cams located in proximity to each other on the opposite side of the drum axis from said hinge point, and two separate and independent shafts for said cams operating said brakes respectively by cam action, both said cam shafts being positioned on the same side of the axle.

2. In apparatus of the character described, the combination of an axle, a wheel at the end of the axle, a brake drum secured to the wheel, two independent expansible brakes operating on the inside of said brake drum and both hinged on the same side of the axis of the drum, a spider secured to the axle, two separate and independent cam shafts lying side by side on the same side of the axle, independent bearings for said cam shafts carried by said spider, said bearings being positioned on the opposite side of the axle from said hinge point, and cams carried by said cam shafts for operating said brakes respectively by cam action.

3. In apparatus of the character described, the combination of an axle, a wheel at the end of the axle, a brake drum on the wheel, a spider at the end of the axle, two independent expansible brakes operating on the inside of the drum, both hinged on the same side of the axis of the drum, a cam operating one of the brakes, and a second cam operating the other brake, said cams being in proximity to each other and on the opposite side of the drum axis from said hinge point, one of said cams being located nearer the periphery of the brake drum and farther in toward the closed end of the drum than the other, separate shafts for said cams lying side by side along the axle, and separate bearings for the shafts each supported from the spider.

4. In apparatus of the character described, the combination of an axle, a wheel at the end of the axle, a brake drum on the wheel, a spider at the end of the axle, two independent expansible brakes operating on the inside of the drum, both hinged on the same side of the axis of the drum, a cam operating one of the brakes, and a second cam operating the other brake, said cams being in proximity to each other and on the opposite side of the drum axis from said hinge point, one of said cams being located nearer the periphery of the brake drum and farther in toward the head of the drum than the other, separate shafts for said cams lying side by side along the axle, and separate bearings for the shafts, the bearing for the cam shaft nearest the brake drum periphery being supported in a portion of the spider projecting in proximity to the periphery of the drum, and a bracket on the spider carrying the bearing for the other cam shaft.

5. In apparatus of the character described, the combination of a dead-axle, a tread wheel at the end of the axle, a driving spindle, a ring gear secured to the wheel, means gearing said spindle to said gear, a brake drum also secured to the wheel and surrounding said ring gear, two independent expansible brakes arranged side by side and operating on the inside of said brake drum, both brakes being hinged at the same side of the axis of the drum, two brake cams located in proximity to each other on the opposite side of said drum axis from said hinge point, one of said cams being located between the ring gear and the periphery of the drum and the other cam being laterally spaced from the ring gear away from the wheel and nearer the axis of the drum than the first cam, a spider at the end of the axle extending between the ring gear and the laterally spaced cam, and a shaft for the cam above the ring gear journaled in said spider, a bracket extending from said spider, and a shaft for the other cam journaled in said bracket, said shafts being separate and independent of each other and lying side by side on the same side of the axle.

6. In apparatus of the character described, the combination of an axle, a wheel at the end of the axle, a brake drum on the wheel, a spider at the end of the axle, two independent expansible brakes operating on the inside of the drum, each brake comprising two rigid curved brake members carrying brake bands, the rigid brake members of the respective brakes being positioned to swing toward and from each other hinge-like, the hinge points of said brakes being in proximity to each other, a cam operating one of the brakes by direct cam action against the free ends of the rigid members, a second cam operating directly against the free ends of the other brake members, said cams being located in proximity to each other and on the opposite side of the drum axis from the fixed ends of the brake members, one of the cams being located nearer the periphery of the brake drum and farther in toward the closed end of the drum than the other, separate shafts for said cams, and separate bearings for the shafts, each supported by the spider, side by side along the axle.

7. In apparatus of the character described, the combination of an axle, a wheel at the end of the axle, a brake drum on the wheel, two independent expansible brakes operating on the inside of the drum, both hinged on the same side of the axis of the drum, a cam operating one of the brakes, and a second cam operating the other brake, said cams being in proximity to each other and on the opposite side of the drum axis from said hinge point, one of said cams being located nearer the periphery of the brake drum and farther in toward the closed end of the drum than the other, separate shafts for said cams and separate bearings for the shafts, said shafts extending side by side along the axle and substantially in a common plane with the axis of said axle.

8. In apparatus of the character described, the combination of an axle, a wheel at the end of the axle, a brake drum on the wheel, a spider at the end of the axle, two independent expansible brakes operating on the inside of the drum, both hinged on the same side of the axis of the drum, a cam operating one of the brakes, and a second cam operating the other brake, said cams being in proximity to each other and on the opposite side of the drum axis from said hinge point, one of said cams being located nearer the periphery of the brake drum and farther in toward the head of the drum than the other, separate shafts for said cams, lying side by side along the axle, separate bearings for the outer ends of the shafts carried by the spider, and a bracket secured to said axle and extending out to one side thereof in which the other ends of said shafts are journaled.

9. In apparatus of the character described, the combination of an axle, a rotatable wheel at the end of the axle, a brake drum secured to the wheel, a stationary spider carried by the axle adjacent the wheel, an expanding brake comprising two brake sections operating on the inside of said brake drum, means for actuating said brake section, a projection on said spider, said brake sections having their pivot ends resting against said projection, and a spring connecting said brake sections and tending to hold them in operative position against said projection, said springs having a part engaging said adjacent ends of the brake sections and said projection to key the sections from lateral displacement.

10. In apparatus of the character described, the combination of an axle, a wheel at the end of the axle, a brake drum secured to the wheel, a stationary spider carried by the axle, a brake comprising two rigid brake sections operating on the inside of the brake drum and having their adjacent ends movable hinge-like about a projection on the spider, a removable spring holding said brake members in position against said projection, and a portion of said removable spring member fitting in slots in said projection and in the adjacent ends of said brake members to key said members from lateral movement with respect to said projection.

11. In apparatus of the character described, the combination of a rotatable wheel and a dead axle on which it is journaled, a brake drum secured to the wheel, a stationary spider secured to the end of the dead axle, means including a drive shaft and gearing for driving the wheel, two separate and independent brakes arranged adjacent each other side by side within the drum to operate thereon, each brake comprising two sections hingedly supported on the spider at adjacent points, and projections from the spider slidingly engaging the sections of the brakes to keep adjacent sections of the two brakes properly spaced one from the other.

12. In apparatus of the character described, the combination of a rotatable wheel and its axle, a brake drum secured to the wheel, an internal driving gear secured to the wheel inside of the brake drum, a stationary spider, a brake comprising two brake sections operating on the inside of said drum and pivotally supported on said spider, and interfitting projections and slots, the one on the spider and the other on the brake sections, for preventing lateral displacement of the brake sections, said projections and slots being located at points substantially midway between the ends of the brake sections, and means forming a key passing through the pivot bearing parts of said brake sections and through the pivot on which they bear to hold the sections in alinement thereon.

13. In apparatus of the character described, the combination of a rotatable wheel and its axle, a brake drum secured to the wheel, a stationary spider, two separate and independent brakes arranged adjacent each other side by side within the drum to operate thereon, each brake comprising two sections pivotally supported on the spider at adjacent points, and means on the spider slidingly engaging the sections of the brakes at points remote from their pivot ends, to keep adjacent sections of the two brakes properly spaced one from the other.

In testimony whereof, I have signed my name to this specification.

GUSTAV W. CARLSON.